United States Patent
O'Kane et al.

(10) Patent No.: US 7,149,652 B2
(45) Date of Patent: Dec. 12, 2006

(54) METHOD FOR MODELING DETECTION OF CAMOUFLAGED TARGETS

(75) Inventors: Barbara L. O'Kane, Franconia, VA (US); Gary L. Page, Clifton, VA (US); David L. Wilson, Fredericksburg, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 11/016,861

(22) Filed: Dec. 21, 2004

(65) Prior Publication Data

US 2006/0136172 A1    Jun. 22, 2006

(51) Int. Cl.
G06F 17/18    (2006.01)
(52) U.S. Cl. ..................................... 702/181
(58) Field of Classification Search .......... 702/40, 702/33, 179, 180, 181, 182; 356/5.01, 141.5; 250/252.1, 332; 359/613, 350
See application file for complete search history.

(56) References Cited

U.S. PATENT DOCUMENTS 5,734,495 A * 3/1998 Friedman ............... 359/350
6,882,409 B1 * 4/2005 Evans et al. ............ 356/4.01

OTHER PUBLICATIONS

Barbara L. O'Kane, Validation Of Prediction Models For Target Acquisition With Electro-Optical Sensors, Vision Models For Target Detection And Recognition, 1995, 193-218, vol. II, World Scientific Publishing Co., Singapore.

* cited by examiner

Primary Examiner—Bryan Bui
(74) Attorney, Agent, or Firm—Andrew Romero

(57) ABSTRACT

The methods for determining the probability of detection of a thermally camouflaged target at various ranges by the sensor includes determining an "inherent" temperature difference, $\Delta T_{RSS}$, between the target and its immediate surroundings. Once $\Delta T_{RSS}$ is determined, a scaled $N_{50}$ cycle criterion, or the number of resolvable cycles needed by the sensor for a fifty percent probability of detection, is determined according to the relationship $N_{50}=A/(\Delta T_{RSS})^B+C$, where A, B and C are constants that are predetermined according to whether the immediate surroundings are of a woodland or a littoral nature. The scaled $N_{50}$ cycle criterion is then used in an empirical Target Transfer Probability Function (TTPF) defined by $P=(N/N_{50})^E/(1+(N/N_{50})^E)$, where $E=2.7+0.7(N/N_{50})$, in order to determine the probability of detection of the thermally camouflaged target.

9 Claims, 2 Drawing Sheets

METHOD FOR MODELING DETECTION OF CAMOUFLAGED TARGETS

GOVERNMENT INTEREST

The invention described herein may be manufactured, used, sold, imported, and/or licensed by or for the Government of the United States of America.

FIELD OF THE INVENTION

The present invention applies generally to methods for modeling sensor performance. More particularly, the present invention applies to an analytical method for predicting the detection of a camouflaged target by systems that image in the mid- and far-infrared spectral bands.

BACKGROUND OF THE INVENTION

Accurate predictions of electro-optical imager performance (in terms of the range at which the imager will detect a target) are important for several reasons. The predictions serve as a guide for system development by providing a means for comparing different systems while still in their design phase, and they can be used to decide if systems with a specific design will meet established requirements. The predictions are also used in war game simulations that directly influence the development of engagement tactics. Thus, it is very important to be able to model the performance of sensors, in terms of the probability that they will detect a given target at a particular range.

One of the primary modeling techniques known in the prior art is the ACQUIRE model. The ACQUIRE model uses several parameters in order to develop an empirical Target Transfer Probability Function (TTPF). The TTPF then predicts the probability of detection for the particular target at various ranges with some confidence.

The ACQUIRE model, however, suffers from certain limitations. Specifically, camouflaged and reduced signature targets have long presented problems for modeling target acquisition performance, and the ACQUIRE model loses integrity when the target is thermally camouflaged. Stated differently, the ACQUIRE method for comparing sensor performance is relatively insensitive to target temperature contrast, and field studies have determined that the ACQUIRE method generally overestimates the range at which low thermal contrast targets are detected. This inaccuracy in prediction modeling has hampered the evaluation of camouflage effectiveness, and it hinders the development of engagement tactics for various weapons systems.

To compensate for the above limitation, one solution often used by war gamers involves adjusting the ACQUIRE cycle criterion, or the ACQUIRE $N_{50}$ variable, in accordance with available data for the vehicle of interest or its surrogates. $N_{50}$ describes the number of cycles across a target that must be resolved to achieve a 50 percent probability of detection. For example, the standard manner of accounting for parameters that the ACQUIRE method does not directly model (for example, target motion, varying scene clutter levels and camouflage) has typically been to decrease the ACQUIRE cycle criterion, $N_{50}$, for moving targets (moving targets are easier to spot) or increase the $N_{50}$ cycle criterion for camouflaged vehicles (which has the effect of making them more difficult to spot). But it has heretofore been unclear how much $N_{50}$ must be adjusted to achieve an accurate prediction. If $N_{50}$ is increased too much, an underestimation of sensor performance results. Conversely, if the ACQUIRE methodology described above is used to predict the detection range of a thermally camouflaged target, an inaccurate prediction results. A further disadvantage of requiring special test and/or analyses for each situation is that it leads to great inefficiencies and long delays associated with acquiring appropriate data for use in estimating lower contrast target performance.

In light of the above, it is an objective of the present invention to provide a method for predicting the detection range of low thermal contrast targets. It is another objective of the present invention to provide a method for accurate modeling of thermal sensor performance in the detection of a thermally camouflaged target. Yet another objective of the present invention is to provide a method for target acquisition modeling which predicts sensor performance against low thermal contrast (camouflaged) targets without perturbing the prediction performance against high thermal contrast (uncamouflaged) targets. Yet another objective of the present invention is to provide a modeling method which more accurately predicts sensor performance against low contrast targets without requiring highly detailed knowledge of the scenario within which the detection takes place. It is another goal of the present invention to provide a method for modeling of target acquisition and prediction which can be accomplished relatively easily in a cost-effective manner.

SUMMARY OF THE INVENTION

A method for predicting the detection range of a thermally camouflaged target in accordance with the present invention includes the step of defining a number of cycles resolved N, or the number of cycles resolved by a particular sensor against a particular target at a particular range R. The cycle criterion N is given by:

$$N=(C_d)(f_r)/R$$

where $C_d$ is the characteristic size of said target (in meters) and is given by the square root of the cross-sectional area of the target, and $f_r$ is the frequency in cycles per milliradian resolved by said given sensor at the target's apparent thermal contrast. The "apparent" contrast of a target is its contrast through the atmosphere at range. This is to be distinguished from a target's "inherent" contrast which is calculated right at the target and which does not include any atmospheric effects in the calculation. The invention uses the inherent contrast to predict an $N_{50}$ for the camouflaged case and the apparent contrast to predict for that target what the probability of detection is for a particular range. However, the apparent contrast is used to predict the ability of the sensor to resolve a target at range. A special case of the cycle criterion N is $N_{50}$, or the number of cycles required to be resolved by the sensor in order to achieve a fifty percent (50%) probability of detection, also known as the "cycle criterion."

The ACQUIRE model uses a standard $N_{50}$ for uncamouflaged targets. To account for thermal camouflage effects, the methods of the present invention include a method to determine the proper $N_{50}$ for camouflaged targets without the requirement to do a field test. The first step of this process is determining the inherent temperature difference, $\Delta T_{RSS}$, between the target and its immediate surroundings. $\Delta T_{RSS}$, also referred to as the target's thermal contrast, is calculated according to the formula:

$$\Delta T_{RSS}=((T_T-T_B)^2+S_T^2)^{1/2},$$

where $T_T$ is the average temperature of the target, $T_B$ is the average background temperature of the immediate surroundings of the target and $S_T$ is the standard deviation of the target temperature, i.e., the variation within the target.

Once N and $\Delta T_{RSS}$ are found, the methods of the present invention include the step of scaling the $N_{50}$ variable with the inherent $\Delta T_{RSS}$ variable to account for thermal camouflaging of the target according to the relationship:

$$N_{50}=A/(\Delta T_{RSS})^B+C,$$

where A, B and C are empirically determined constants. The constants A, B and C are chosen according to the nature of the background of the target, which affects the target clutter that is observed by a sensor. For a woodland (moderate clutter) background, the constant A is predetermined to be 6, the constant B is predetermined to be 2 and the constant C is predetermined to be 1.5. For a littoral (low clutter) background environment, the constants A, B and C are predetermined to be 0.75, 2 and 0.75, respectively.

Once the scaled criterion $N_{50}$ is determined as described immediately above, the method of the present invention includes predicting a range using the ACQUIRE model, and inputting the scaled cycle criterion $N_{50}$. The ACQUIRE model defines a Target Transfer Probability Function (TTPF) that is given by:

$$P=(N/N_{50})^E/(1+(N/N_{50})^E),$$

where $E=2.7+0.7(N/N_{50})$. Other expressions for E, however, could be used with the TTPF above within the ACQUIRE model.

The probability of detection can then be calculated using the above TTPF. Alternatively, the TTPF probability P can be plotted as a function of range, and the probability at which a thermally camouflaged target can be detected at a given range can be determined by referencing the graph of the TTPF.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENT

Figure 1:
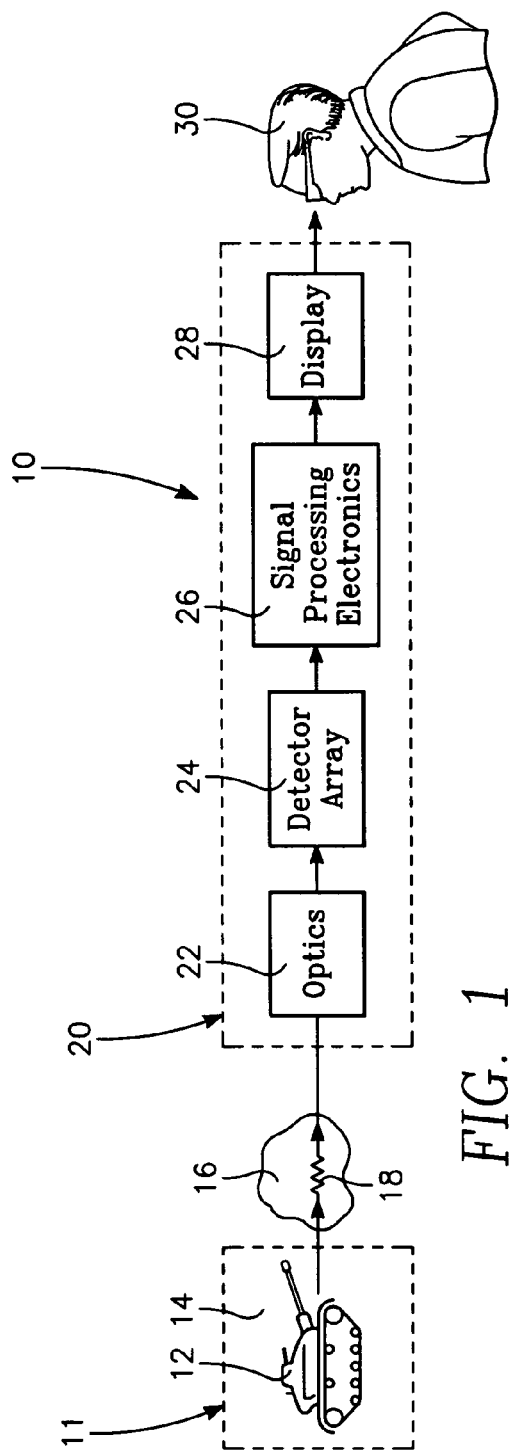
FIG. 1 is schematic diagram of an imaging chain that depicts the target detection process.

By way of background, and referring initially to FIG. 1, a simplified diagram of image chain 10 that illustrates the important components of target acquisition problem is presented. As shown, the radiance 18 from the scene 11 is a complex function of thermal radiance from target 12 and the immediate background thereof 14, with the nature of the complex function described in greater detail below. The emitted or reflected radiation 18 passes through the atmosphere 16, where some of the radiance is absorbed or scattered. Background radiation can also be scattered into the same path toward the imaging system.

After passage through the atmosphere as described above, radiation 18 is received by imaging system 20. Within imaging system 20, optics 22 gather the radiation and form an image of the scene at the image plane of the system. A single detector 24 (or an array of single detectors 24) samples the incident radiation. The image can be sampled in various ways: A single detector or an array of detectors can rapidly scan across an image, or a two-dimensional array can simply stare at the scene. The sampled incident radiation is transduced into electrical signals which are processed by electronics 26 and formatted for observation at a display 28. The user 30 views the image and tries to make a decision as to whether a target of interest is within the sensor's field of view.

There are several factors that affect target detection, including, but not limited to, the factors listed in the below Table.

TABLE 1

FACTORS AFFECTING THE IMAGING CHAIN

| Major Factor | Subfactors | |
|---|---|---|
| Target and Background | Type | Motion |
| | Size | Shadow |
| | Shape | Masking |
| | Contrast | Camouflage |
| | Temperature | Clutter |
| Environment | Visibility | Illumination level |
| | Cloud cover | Attenuation |
| | Sun Angle | Transmittance |
| | Solar Loading | Scattering |
| Platform | Crew size and interaction | Altitude |
| | | Range |
| | Vibration environment | Speed |
| | Target exposure time | |
| Sensor parameters | Sensor type | Sample rate |
| | Spectral band | Interlace |
| | Field of view | Frame rate |
| | Resolution | LOS panning capability |
| | Dynamic Range | |
| | Sensitivity | Field of regard |
| | | Search field size |
| Observer | Training | Visual acuity |
| | Motivation | Search pattern |
| | Experience | Fatigue |
| | Prebriefing | Age |
| | Stress | |

The Table above illustrates the complexity of the modeling process depicted by imaging chain 10. No single model of a target acquisition process can possibly account for all of the above-listed factors. Because of this, many models frequently incorporate simplifying assumptions, and they are usually validated for only a small portion of possible missions or situations for which sensor performance assessment is desired.

The prior art ACQUIRE model includes range prediction methodologies for target detection and recognizes that the probability of detecting, recognizing, and identifying a target is a function of the number of equivalent cycles resolved on the target by the sensor. For a target at a given range, and with an apparent signature, the number of equivalent cycles resolved is given by:

$$N=(C_d)(f_r)/R$$

where $C_d$ is the characteristic size of the target (meters), R is the range to the target (kilometers), and $f_r$ is the frequency (cycles/milliradian) resolved by the sensor for the target with the target's apparent contrast. The cycle criterion, referred to as $N_{50}$, is the number of cycles that are required to be resolved by the sensor in order to achieve a 50% probability of detection.

Figure 2:
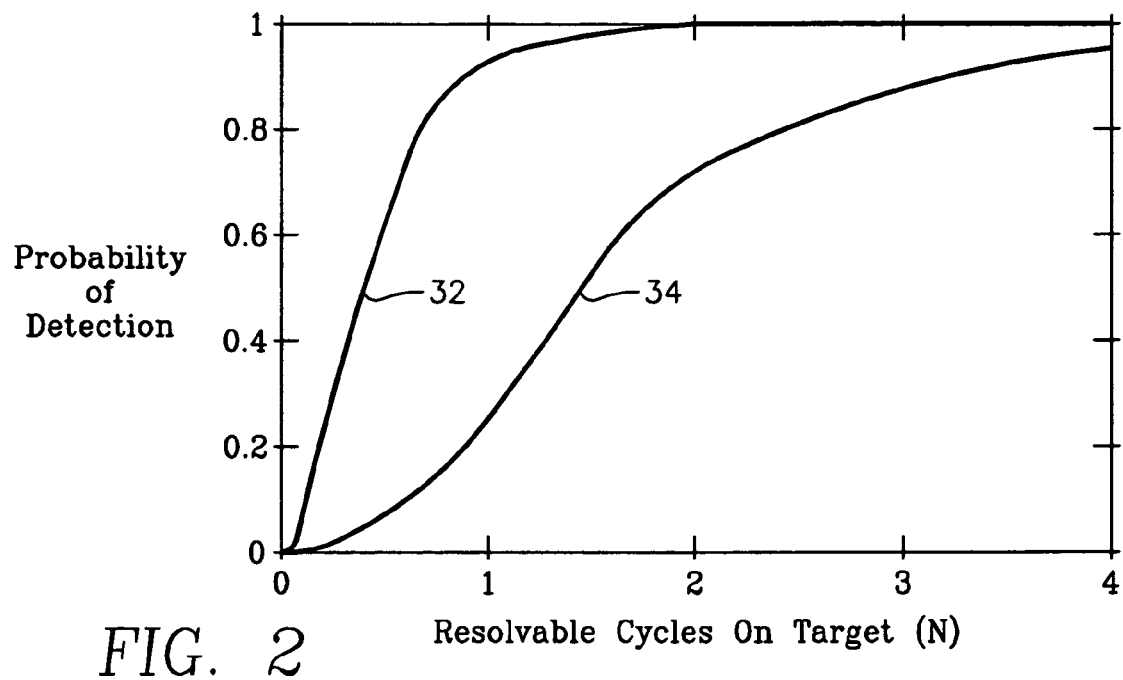
FIG. 2 is graph of the Target Transfer Probability Function (TTPF) for the ACQUIRE method, which plots probability of detection of a target as a function of the cycles resolved by the sensor.

Once the number of equivalent cycles that are resolved is determined, the probability of detection is then found using an empirical Target Transform Probability Function (TTPF), as shown in FIG. 2. ACQUIRE uses a curve fit to the TTPF that is given by:

$$P=(N/N_{50})^E/(1+(N/N_{50})^E),$$

where $E=2.7+0.7(N/N_{50})$. Other expressions for E could also be used with the TTPF above within the ACQUIRE model.

The above-cited ACQUIRE process is known in the art and is further described in Chapter 8 of "Vision Models For Target Detection And Recognition", Editor: Eli Peli, *Series on Information Display*, Volume 2, World Scientific Publishing Company, 1995, which is hereby incorporated by reference. The ACQUIRE process can be used for detection, recognition or identification of a target, and is used widely in the visible and infrared spectrums.

Figure 3:
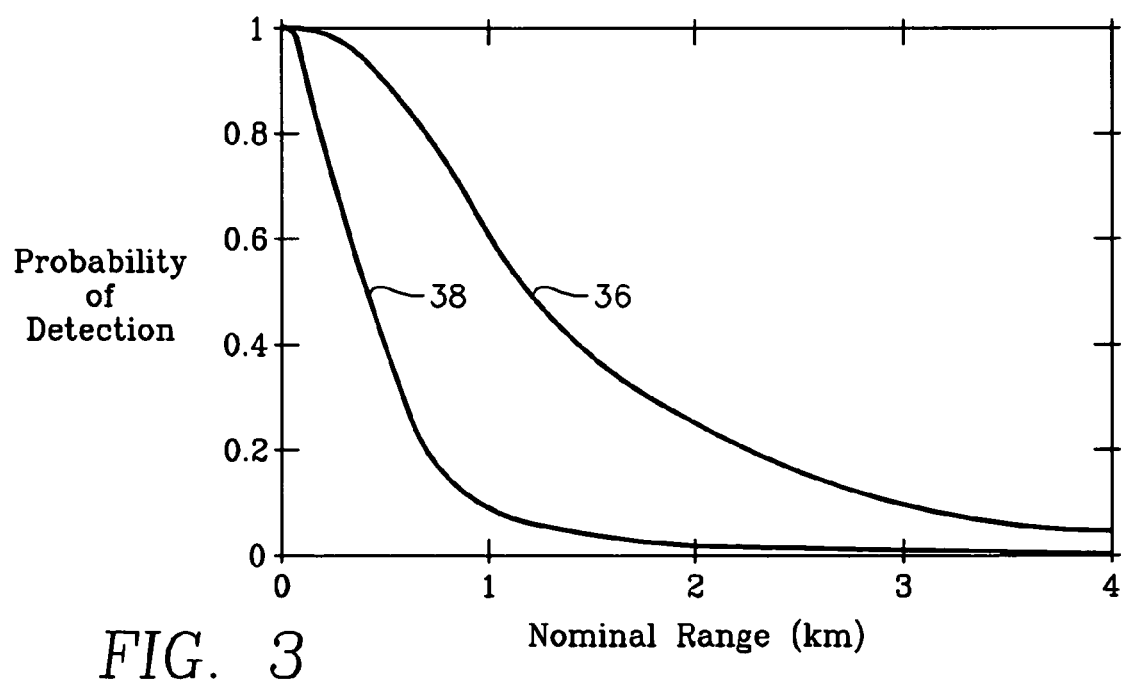
FIG. 3 is graph of the Target Transfer Probability Function (TTPF) for the ACQUIRE method, which plots probability of detection of a target as a function of the range of the target from the sensor.

The ACQUIRE model is relatively insensitive to reductions in thermal signature contrast of a target (i.e., if the target is thermally camouflaged), however, and the ACQUIRE model loses integrity once the target is thermally camouflaged. Referring now to FIG. 2 and FIG. 3, the effects of thermal camouflage can be shown. FIG. 2 is a graph of the probability of detection as a function of resolved cycles, while FIG. 3 is a graph of the probability of detection of a target as a function of its range from the sensor. In FIG. 2, the predicted performance in a cluttered background using a "standard" $N_{50}$ value of 1.5 for an uncamouflaged target is depicted by curve 32. The empirical results for the same vehicle, by the same sensor are illustrated by curve 34. Similarly, in FIG. 3, the predicted range of detection using the aforementioned "standard" N50 value of 1.5 for a camouflaged vehicle is shown by curve 36, while the range of detection that was actually observed is depicted by curve 38. By cross-referencing FIGS. 2 and 3, it can be seen that the ACQUIRE model did not accurately model the sensor performance for detection of the thermally camouflaged vehicle.

Typically, the $N_{50}$ variable is scaled upward to account for thermal camouflaging effects. The present invention avoids the continuing necessity for field and perception tests to define this adjustment by describing a relationship between $N_{50}$ and the inherent thermal contrast, $\Delta T_{RSS}$, of the target vehicle. The relationship is described more fully below and can be used to accurately scale $N_{50}$ in a manner that results in an accurate range prediction for thermally camouflaged targets when using the ACQUIRE model.

Figure 4:
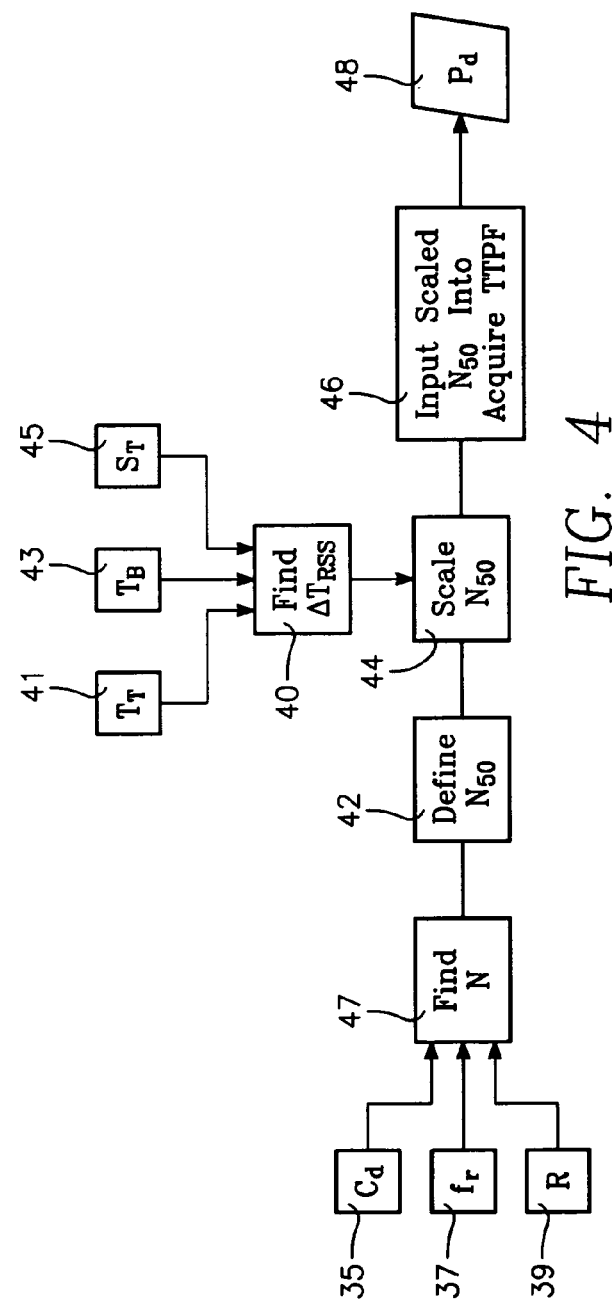
FIG. 4 is a block diagram that illustrates the steps of the methods of the present invention.

Referring now to FIG. 4, the methods of the present invention are described in greater detail. Specifically, the first step of the invention as depicted by block 40 is to determine $\Delta T_{RSS}$, the inherent temperature difference between the target and its immediately surrounding environment. $\Delta T_{RSS}$ is determined using the average temperature of the target, $T_T$, the standard deviation of the target's temperature, $S_T$, and the average temperature of the background, $T_B$, as indicated by respective blocks 41, 43 and 45 in FIG. 4. $\Delta T_{RSS}$ is found using these variables according to the relationship:

$$\Delta T_{RSS}=((T_T-T_B)^2+S_T^2)^{1/2},$$

where $T_T$ is the average temperature of the target, $T_B$ is the average temperature of the immediate background and $S_T$ is the standard deviation of the target's temperature. $\Delta T_{RSS}$ will be used to adjust the standard ACQUIRE procedure in a manner hereinafter described.

To methods of the present invention includes finding the number of resolvable cycles N resolved on the target by the sensor at a particular range, as indicated by block 47 in FIG. 4. N is found using the characteristic size $C_d$, (block 35) the frequency $f_r$ (cycles/milliradian) resolved by the sensor for the target (block 37) and the range of the target R (block 39). As described above N is determined by the relationship:

$$N=(C_d)(f_r)/R.$$

Once N is determined, the methods of the present invention include defining an $N_{50}$ variable, or the cycle criterion as described above and as indicated by block 42 in FIG. 4. The cycle criterion is empirically determined as the number of cycles required by the sensor for a fifty percent probability of detection. Once $N_{50}$ is determined, the methods of the present invention include to scaling the $N_{50}$ criterion with the $\Delta T_{RSS}$ variable to account for thermal camouflaging effects, as shown by block 44. This is accomplished according to the relationship:

$$N_{50} = \frac{A}{(\Delta T_{RSS})^B} + C,$$

where A, B and C are empirically determined parameters, or predetermined constants. In the preferred embodiment, when the target is surrounded by woodland environment, the predetermined constants used are A=6, B=2 and C=1.5, respectively. If the target to be detected is surrounded by a littoral environment, the predetermined constants used are A=0.75, B=2 and C=0.75.

Once the scaled $N_{50}$ variable is determined, the probability of detection can be calculated as a function of range by using the TTPF function from the ACQUIRE model described above, but with the scaled $N_{50}$ variable, which accounts for the thermal camouflaging of the target. This is depicted by block 46 in FIG. 4, and as described above, the ACQUIRE TTPF is given by:

$$P=(N/N_{50})^E/(1+(N/N_{50})^E),$$

where $E=2.7+0.7(N/N_{50})$. Other expressions for E could also be used with the TTPF above within the ACQUIRE model. The output is probability of detection $P_d$, as indicated by block 48.

While the methods for predicting the detection ranges of thermally camouflaged targets, as herein shown and disclosed in detail, is fully capable of obtaining the objectives and providing the advantages above stated, it is to be understood that the presently preferred embodiments are merely illustrative of the invention. As such, no limitations are intended other than as defined in the appended claims.

What is claimed is:

1. A method for assessing the detection probability of a camouflaged target by a given sensor at a given range R, comprising the steps of:
   A) determining the cycles resolved on the target (N) for said sensor as the number of equivalent cycles resolved by the sensor with its apparent thermal contrast;
   B) defining a variable $N_{50}$ as the cycle criterion required for a fifty percent (50%) probability of detection of said target;

C) determining the inherent $\Delta T_{RSS}$ of the camouflaged target;

D) scaling the result of step B) according to the relationship $$N_{50} = \frac{A}{(\Delta T_{RSS})^B} + C,$$

where A, B and C are predetermined constants;

E) determining the probability P of detection according to the relationship:

$$P=(N/N_{50})^E/(1+(N/N_{50})^E),$$

where $E=2.7+0.7(N/N_{50})$, and

F) predicting an accurate model of a sensor's performance.

2. The method of claim 1 wherein step A) is accomplished according to the relationship:

$$N=(C_d)(f_r)R,$$

where $C_d$ is the characteristic size in meters of said target and is defined by the square root of the cross-sectional area of said target, and $f_r$ is the frequency in cycles per milliradian resolved by said given sensor at the apparent thermal contrast, and R is the distance from the sensor in kilometers.

3. The method of claim 1 wherein step (C) is accomplished using the formula $$\Delta T_{RSS}=((T_T-T_B)^2+S_T^2)^{1/2},$$

where $T_T$ is the average temperature of the target, $T_B$ is the average temperature of the immediate background and $S_T$ is the standard deviation of the temperature of the target.

4. The method of claim 3 wherein the immediate surroundings are a woodland environment and wherein step (D) is accomplished with said constant A=6, said constant B=2 and said constant C=1.5.

5. The method of claim 3 where the immediate surroundings are a littoral environment and wherein said step (D) is accomplished with said constant A=0.75, said constant B=2 and said constant C=0.75.

6. A method of predicting the range detection of a thermally camouflaged target comprising the steps of:

(A) determining the inherent temperature difference between the target and its immediate surroundings, $\Delta T_{RSS}$;

(B) determining an $N_{50}$ variable according to the relationship $$N_{50} = \frac{A}{(\Delta T_{RSS})^B} + C$$

where A, B and C are predetermined constants;

(C) calculating the probability of detection as a function of range with the ACQUIRE model using the $N_{50}$ variable from step B, and (D) predicting an accurate model of a sensor's performance.

7. The method of claim 6 wherein step (A) is accomplished using the formula $$\Delta T_{RSS}=((T_T-T_B)^2+S_T^2)^{1/2},$$

where $T_T$ is the average temperature of the target, $T_B$ is the average temperature of the immediate background and $S_T$ is the standard deviation of the target's temperature.

8. The method of claim 7 wherein the immediate surroundings are a woodland environment and wherein step (B) is accomplished with said constant A=6, said constant B=2 and said constant C=1.5.

9. The method of claim 7 where the immediate surroundings are a littoral environment and wherein said constant A=0.75, said constant B=2 and said constant C=0.75.

* * * * *